United States Patent [19]

Bartkowiak et al.

[11] Patent Number: 5,809,133
[45] Date of Patent: Sep. 15, 1998

[54] DTMF DETECTOR SYSTEM AND METHOD WHICH PERFORMS FREQUENCY DOMAIN ENERGY CALCULATIONS WITH IMPROVED PERFORMANCE

[75] Inventors: John G. Bartkowiak, Austin; Zheng-yi Xie, Richardson, both of Tex.

[73] Assignee: Advanced Micro Devices, Inc., Sunnyvale, Calif.

[21] Appl. No.: 653,283

[22] Filed: May 24, 1996

[51] Int. Cl.[6] .................................................. H04M 3/00
[52] U.S. Cl. ........................ 379/386; 379/282; 379/283
[58] Field of Search .................................. 379/386, 282, 379/283, 351, 77, 284; 364/724.19, 724.09, 726

[56] References Cited

U.S. PATENT DOCUMENTS

| | | | |
|---|---|---|---|
| 4,066,881 | 1/1978 | Houdard | 364/126 |
| 5,119,322 | 6/1992 | Stroobach | 364/724.09 |
| 5,257,309 | 10/1993 | Brandman et al. | 379/283 |
| 5,325,427 | 6/1994 | Dighe | 379/386 |
| 5,353,345 | 10/1994 | Galand | 379/386 |
| 5,408,529 | 4/1995 | Greaves | 379/386 |
| 5,426,696 | 6/1995 | Zimbrek | 379/386 |
| 5,428,680 | 6/1995 | Murata et al. | 379/386 |
| 5,477,465 | 12/1995 | Zheng | 364/724.08 |
| 5,588,053 | 12/1996 | Xie | 379/386 |
| 5,644,643 | 7/1997 | Xie et al. | 379/386 |

OTHER PUBLICATIONS

"Tone Detection Process," IBM Technical Disclosure Bulletin, vol. 38, No. 7, Jul. 1, 1995, pp. 567–571.

Gay, S.L. et al., "Algorithms for Multi–Channel DTMF Detection for the We DSP32 Family," Speech Processing 2, Digital Signal Processing, Glasgow, May 23–26, 1989, vol. 2, May 23, 1989, Institute of Electrical and Electronic Engineers, pp. 1134–1137.

International Search Report for PCT/US 97/02511 dated Aug. 27, 1997.

D'Avella et al., "An Adaptive MLSE Receiver for TDMA Digital Mobile Radio," IEEE Journal on Selected Areas in Communications, vol. 7, No. 1, Jan. 1989, pp. 122–29.

Dzung, Dacfey, "Error Probability of MLSE Equalization using Imperfect Channel Measurements, " International Conference on Communications, Jun. 23–26, 1991, pp. 0559–0562.

*Digital Signal Processing Applications Using the ADSP–2100 Family*, vol. 1, by The Applications Engineering Staff of Analog Devices, DSP Division, Edited by Amy Mar, 1992 by Analog Devices, Inc., pp. 441–500.

*Primary Examiner*—Krista Zele
*Assistant Examiner*—Jacques M. Saint-Surin
*Attorney, Agent, or Firm*—Conley, Rose & Tayon; Jeffrey C. Hood

[57] ABSTRACT

An improved dual tone multifrequency (DTMF) or multitone signal detector which more efficiently detects DTMF signals. For each received frame, the present invention initially performs only a portion of the Goertzel DFT algorithm for each of the possible tone frequencies and then analyzes the interim accumulated energies. The DTMF detector then selects one or more frequencies from each of the tone groups which have the largest energy values, and the detector only completes calculation of the Goertzel DFT algorithm on those selected one or more frequencies. In other words, the DTMF detector discontinues calculation of the Goertzel DFT algorithm on one or more frequencies which have low accumulated interim energies. This reduces the computational requirements and provides improved performance.

17 Claims, 12 Drawing Sheets

N(1)=172; N(2)=177; N(3)=178; N(4)=178; N(5)=172

N(6)=168; N(7)=168; N(8)=176; N(m)=N(m−8), for m=9,..,16

DTMF DETECTOR SYSTEM AND METHOD WHICH PERFORMS FREQUENCY DOMAIN ENERGY CALCULATIONS WITH IMPROVED PERFORMANCE

FIELD OF THE INVENTION

The present invention relates to the detection of dual tone multifrequency coded signals, and more particularly to a DTMF detector which performs frequency domain energy calculations using an algorithm such as the Goertzel algorithm, wherein the DTMF detector analyzes interim energy values for the different frequencies during the frequency domain calculations and discontinues calculations on low energy values for improved performance.

DESCRIPTION OF THE RELATED ART

Dual tone multifrequency (DTMF) coding is a generic name for push-button telephone signaling which is used in North American telephone systems. A DTMF signal is used for transmitting a phone number or the like from a push button telephone to a telephone central office. DTMF signaling is quickly replacing dial pulse signaling in telephone networks worldwide. In addition to telephone call signaling, DTMF coding is also becoming popular in interactive control applications, such as telephone banking, electronic mail systems, and answering machines, wherein the user can select options from a menu by sending DTMF signals from a telephone.

A dual tone signal is represented by two sinusoidal signals whose frequencies are separated in bandwidth and which are uncorrelated in order to avoid false tone detections. In general, normal speech patterns or noise signals produce a signal with energy distributed throughout the frequency band. In some cases, speech may have sufficient energy on two or more DTMF frequencies to trigger a false detection.

As noted above, a DTMF signal encoder generates a DTMF signal by adding together two sinusoidal signals. A DTMF signal includes one of four tones, each having a frequency in a low frequency band, and one of four tones, each having a frequency in a high frequency band. In current DTMF systems, the following frequencies are allocated for the four tones in the low frequency band: FA=697 Hz; FB=770 Hz; FC=852 Hz, and; FD=941 Hz; and the following frequencies are allocated for the four tones in high frequency band: FE=1209 Hz; FF=1336 Hz; FG=1447 Hz, and FH=1633 Hz. The frequencies used for DTMF encoding and detection are defined by the CCITT and are accepted around the world, thus allowing dialing compatibility throughout the world.

As DTMF signals travel down a transmission line, such as a telephone line, the signals may become distorted due to attenuation or to any number of other affects, such as channel noise, radiation, etc. In addition, in some instances, voice or speech signals propagate down a telephone line simultaneously with DTMF signals in the same frequency bandwidth. Due to noise affects or speech, a DTMF signal can be missed by the detector, referred to as "talk-down". Also, speech can have a frequency domain content similar to a DTMF signal and trigger erroneous detection, this being referred to as a "talk-off" effect. Noise other than speech can also cause adverse effects, and the receiver thus is sometimes unable to discern which DTMF signal has been detected.

The CCITT and AT&T have promulgated various standards for DTMF detectors. These standards involve various criteria, such as frequency distortion allowance, twist allowance, noise immunity, guard time, talk-down, talk-off, acceptable signal to noise ratio, and dynamic range, etc. The distortion allowance criteria specifies that a DTMF detector is required to detect a transmitted signal that has a frequency distortion of less than 1.5% and should not detect any DTMF signals that have frequency distortion of more than 3.5%. The term "twist" refers to the difference, in decibels, between the amplitude of the strongest key pad column tone and the amplitude of the strongest key pad row tone. For example, the AT&T standard requires the twist to be between −8 and +4 decibels. The noise immunity criteria requires that if the signal has a signal to noise ratio (SNR) greater than certain decibels, then the DTMF detector is required to not miss the signal, i.e., is required to detect the signal. Different standards have different SNR requirements, which usually range from 12 to 24 decibels. The guard time check criteria requires that if a tone has a duration greater than 40 milliseconds, the DTMF detector is required to detect the tone, whereas if the tone has a duration less than 20 milliseconds, the DTMF detector is required to not detect the tone. Speech immunity refers to the ability of the DTMF detector to accurately distinguish DTMF tone signals from actual speech. As described earlier, "talk-off" and "talk-down" are two criteria for evaluating speech immunity of a DTMF detector.

Originally, DTMF signal generators and detectors utilized analog circuitry to generate and decode DTMF signals. However, with the rapid advance of VLSI technology and digital signal processing (DSP) technology, many DTMF systems are now employing digital signal processors for increased accuracy and cost efficiency. The advantages of a digital DTMF generation and detection system include improved accuracy, precision, stability, versatility and reprogrammnability, as well as lower chip count. The advantages of a DSP implementation of a DTMF system are especially valid for a telephone company Central Office, where DTMF detection can be simultaneously performed on multiple telephone channels.

In general, a DTMF detector examines the line or communication channel for the presence of two sinusoids using dedicated frequency domain algorithms, including modified Goertzel algorithms, DFT/FFTs, auto-correlation, zero crossing counting, and narrow band filter-based methods, among others. The Goertzel algorithm is the most popular algorithm used in DTMF signal detection because it has the accuracy of a DFT-based algorithm while also having computational efficiency comparable to narrowband filter-based algorithms. Conventional use of the Goertzel algorithm is similar to DFT methods, which compute values in the frequency domain at desired discrete points.

The Goertzel DFT algorithm divides the sampled time domain signal into a plurality of discrete blocks or frames, wherein each frame comprises a plurality of digital samples. The Goertzel DFT algorithm then performs frequency domain or Fourier techniques on each frame to obtain energy values in the frequency domain for each of the possible tone frequencies. Calculation of the Goertzel DFT algorithm for each of the possible tones requires a large amount of processing power and time. Therefore, an improved DTMF detector system and method is desired which performs frequency domain energy computations, such as Goertzel DFT computations, with improved efficiency and reduced computational requirements.

SUMMARY OF THE INVENTION

The present invention comprises an improved dual tone multifrequency (DTMF) or multitone signal detector which more efficiently detects DTMF signals. For each received frame, the present invention performs a portion of the Goertzel DFT algorithm for each of the possible tone frequencies and then analyzes the interim accumulated energies. The DTMF detector then selects one or more frequencies from each of the tone groups which have the largest energy values, and the detector only completes calculation of the Goertzel DFT algorithm on those one or more frequencies. In other words, the DTMF detector discontinues calculation of the Goertzel DFT algorithm on one or more frequencies which have low accumulated energies, thus reducing computational requirements and providing improved performance.

The DTMF detector according to the present invention preferably includes a coder/decoder (codec) receiver which receives signals from the transmission media. The codec samples the received analog signals and produces digital signals, i.e., digital samples. The DTMF detector also includes a digital signal processor (DSP) coupled to the codec. The DSP receives the digital samples and preferably applies the Goertzel DFT algorithm or other frequency domain techniques. The present invention further includes a memory coupled to the DSP which is used by the DSP for temporary storage of data during processing (RAM), and retrieval of data such as filter coefficients (ROM).

According to the present invention, the DTMF detector receives a plurality of digital samples of a received signal, wherein the received signal may include a plurality of tones, such as a DTMF or MTMF (multiple tone multifrequency) signal. The received signals may include DTMF or MTMF tone signals and also may include one or more speech signals and/or noise. The plurality of tones comprise two or more tones from a plurality of different uncorrelated frequencies. In one embodiment, the plurality of different uncorrelated frequencies comprise two or more frequency groups.

After receiving the digital samples, the DTMF detector then begins a frequency spectrum calculation on the plurality of digital samples for each of the plurality of different uncorrelated frequencies. During the frequency spectrum calculations, the DTMF detector first calculates a portion of the Goertzel algorithm, i.e., calculates the algorithm for a subset of the samples for each frequency, to produce intermediate or interim energy values. The DTMF detector then analyzes the interim accumulated energy values and determines if the energy values are all low values and are substantially similar. If so, this indicates that there are no DTMF tones present in the current frame, and the detector discontinues or terminates the Goertzel algorithm calculation, i.e., does not complete the Goertzel calculation for any of the tone frequencies. The DTMF detector also preferably analyzes the interim second harmonic energy values. If any of the second harmonic energy values have substantial energy build-up, then the detector also discontinues or terminates the Goertzel algorithm calculation. In this case, a substantial energy build-up in one or more of the second harmonic energy values indicates that speech is present in the frame being analyzed.

If the above determinations indicate that DTMF tones are present, i.e., if one or more of the first harmonic energy values have accumulated energy, and all of the second harmonic energy values have low accumulated energy, then the detector proceeds. In this case, the DTMF detector then selects one or more frequencies from each of the tone groups which have the largest interim energy values and only completes calculation of the Goertzel DFT algorithm on those one or more frequencies. In other words, the DTMF detector discontinues calculation of the Goertzel DFT algorithm on one or more frequencies which have low accumulated energies, thus reducing computational requirements and providing improved performance. In the preferred embodiment, the DTMF detector selects the two first harmonic energy values with the largest accumulated energies from each group, and also selects the largest second harmonic energy value from each group, and completes the Goertzel computation for these frequencies.

The DTMF detector thus resumes or completes the calculations for only the selected tone frequencies. The calculations produce an energy value for each of the selected tone frequencies. After the frequency domain calculations, i.e., after energy values have been calculated for each of the selected tone frequencies, and after any desired gain adjustment, the DSP determines maximum values of the energy values for each of the two or more frequency groups, referred to as M(1) and M(2), to detect the plurality of tones in the received signal. The DTMF detector then performs any of various desired checking or thresholding tests to ensure valid tone detection.

The present invention thus comprises a system and method for detecting tones in a received signal with reduced processing requirements. The present invention only computes the full Goertzel algorithm on those tone frequencies which have accumulated energy after an initial determination.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

The following U.S. patents and references are hereby incorporated by reference:

U.S. Pat. No. 5,408,529 titled "Dual Tone Detector Operable in the Presence of Speech or Background Noise and Method Therefor"—Greaves, issued Apr. 18, 1995, is hereby incorporated by reference.

U.S. Pat. No. 5,428,680 titled "DTMF Signal Receiving Apparatus Equipped With a DTMF Signal Judging Circuit"—Murata et al., issued Jun. 27, 1995 is hereby incorporated by reference.

U.S. Pat. No. 5,257,309 titled "Dual Tone Multifrequency Signal Detection and Identification Methods and Apparatus"—Brandman et al., issued Oct. 26, 1993 is hereby incorporated by reference.

U.S. Pat. No. 5,353,345 titled "Method and Apparatus for DTMF Detection"—Galand, issued Oct. 4, 1994 is hereby incorporated by reference.

U.S. Pat. No. 5,426,696 titled "Method of Improving Receiver Sensitivity and Speech Immunity With DTMF-Reception"—Zimbrek, issued Jun. 20, 1995 is hereby incorporated by reference.

U.S. Pat. No. 5,325,427 titled "Apparatus and Robust Method for Detecting Tones"—Dighe, issued Jun. 29, 1994 is hereby incorporated by reference.

"Digital Signal Processing Applications Using the ADSP-2100 Family", from Analog Devices Corporation, Volume 1, Chapter 14, pages 441–500 is hereby incorporated by reference in its entirety.

DTMF Detector

The present invention comprises a DTMF detector which performs frequency domain energy calculations with reduced computational requirements according to the present invention. The DTMF detector is comprised in a digital telephone answering machine in the current embodiment. However, it is noted that the present invention may be used in various other applications, including telephone switching and interactive control applications, telephone banking, fax on demand, etc. The DTMF detector of the present invention may also be used as the DTMF detector in a telephone company Central Office, as desired.

The present invention was designed to meet CCITT and AT&T standards, although the invention can be reprogrammed or undergo minor modifications to meet other telecommunication standards. The preferred embodiment was developed to perform DTMF detection functions and preferably comprises a dual tone detector which detects two tones, wherein each tone is one of a plurality of predetermined tones from two respective frequency groups. However, the present invention may comprise a multi tone multi frequency (MTMF) detector for detecting a greater number of tones in a received signal, i.e., two or more tones. The two or more tones may be from two or more different frequency groups or from a single frequency group, as desired. Thus the system and method of the present invention may be used for detecting any number of tones in a received signal.

Figure 1:
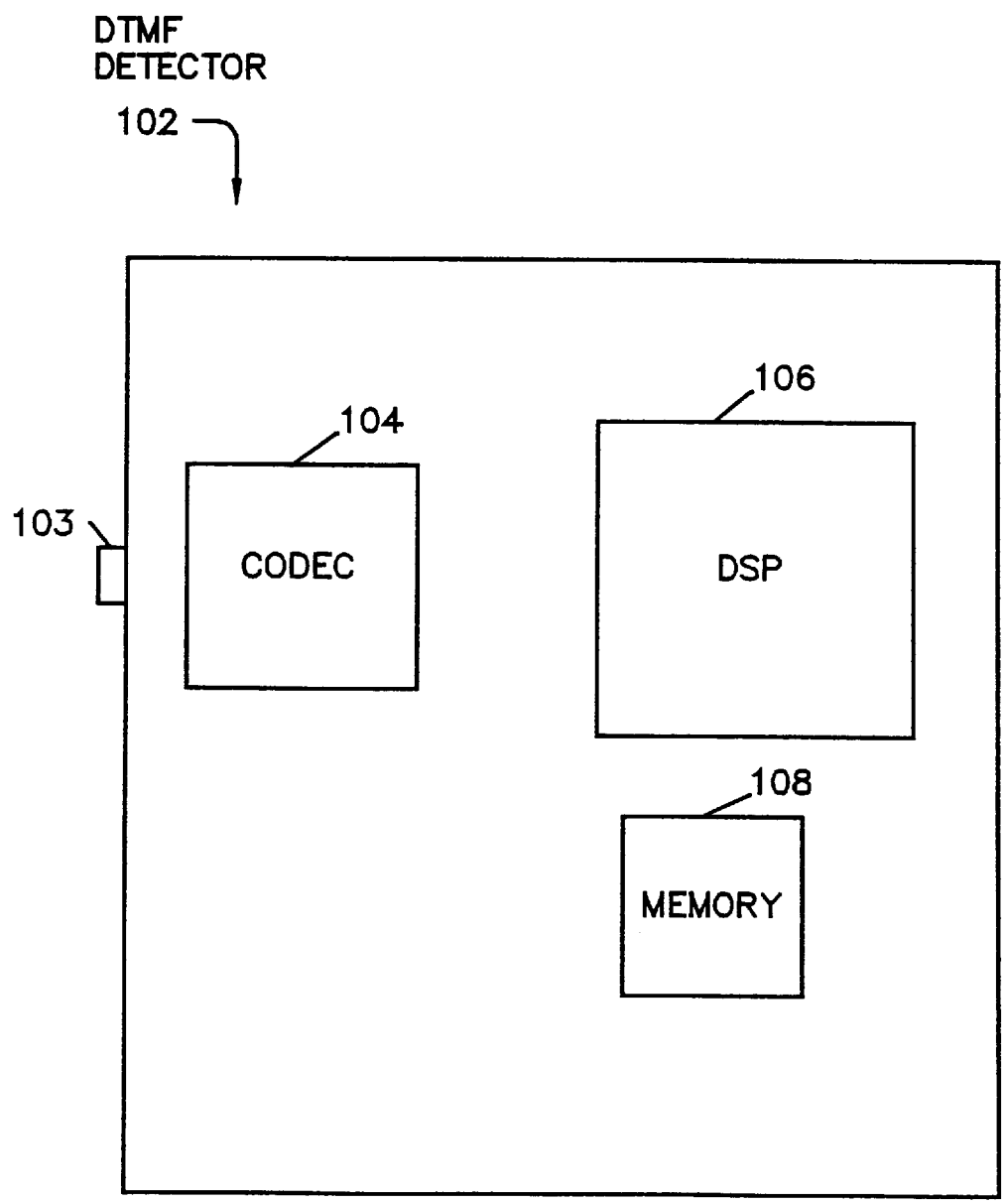
FIG. 1 is a block diagram of the DTMF detector of the present invention.

FIG. 1—Block Diagram

Referring now to FIG. 1, a block diagram of a DTMF detector 102 according to the present invention is shown. As shown, the DTMF detector 102 preferably comprises a port or connector or other means 103 for receiving analog or digital signals. The port 103 is adapted for coupling to a communications medium, such as a phone line, cable or other transmission line. It is noted that the port 103 may comprise any of various means or connectors for coupling to a communications line.

The DTMF detector 102 also preferably comprises a coder/decoder (codec) receiver 104 coupled to the port which receives an analog signal and converts the analog signal into digital format. The codec receiver 104 preferably samples the analog signal at 8 kHz and utilizes pulse code modulation (PCM) or other suitable techniques to produce corresponding digital data. The codec chip 104 preferably comprises linear analog to digital (A/D) converters and digital to analog (D/A) converters. The codec receiver 104 preferably comprises all the necessary A/D, D/A, sampling and filtering circuitry for bi-directional analog digital interfacing. Once analog to digital conversion has been performed, digital data or digital samples are generated based upon the analog signal.

It is noted that the received signal may be compressed or companded, and thus digital data produced by the A/D converter in the codec 104 may be companded, i.e., may comprise logarithmically compressed digital data. As is well-known in the art, companding refers to logarithmically compressing a signal at the source and expanding the signal at the destination to obtain a high end-to-end dynamic range while reducing dynamic range requirements within the communication channel. In this instance, the codec receiver 104 logarithmically expands the data to a linear format, preferably a 16 bit linear format.

In one embodiment, the port 103 in the DTMF detector 102 receives digital signals (i.e., linear or logarithmic PCM) directly from the communication channel or transmission media, and thus a codec 104 is not required in the DTMF detector 102 for analog to digital conversion.

The DTMF detector 102 also preferably includes a digital signal processor (DSP) 106 coupled to the codec 104. The DSP 106 is preferably from the ADSP-2100 family from Analog Devices, Inc. Other equivalent DSPs are acceptable, although a DSP that can perform 16×16 bit hardware multiplication is preferred for accuracy reasons. It is noted that a software multiplier may be used, although the operating speed will be significantly reduced. In the preferred embodiment, the DSP 106 and codec 104 are comprised on a single silicon chip.

The DSP 106 receives the digital samples and preferably applies frequency domain techniques, preferably the Goertzel DFT algorithm, with reduced computational requirements according to the present invention. The Goertzel DFT algorithm divides the sampled time domain signal into a plurality of discrete blocks or frames and then performs Fourier techniques on each frame to obtain energy values in the frequency domain for each of the possible tones. In the preferred embodiment, the DTMF detector 102 also utilizes differing frame widths for different ones of the possible tone frequencies.

The DTMF detector 102 further includes a memory 108 coupled to the DSP which is used by the DSP 106 for storage and retrieval of data. Preferably, the memory comprises a RAM (random access memory) for processing storage and loading of program data at the time of operation, and a ROM (read-only memory) for storage of fixed values, such as filter coefficients and other parameters used by the program. The program is also preferably stored in the ROM before loaded into RAM. The memory requirement for the DTMF detector alone is about 2.0 kbytes of ROM and 200 bytes of RAM. The memory requirement is architecturally dependent and also depends on implementation. It is noted that the memory 108 may comprise any of various types or sizes, as desired.

It is noted that the present invention may include a general purpose microprocessor instead of DSP 106. The present invention may also include dedicated digital and/or analog hardware instead of, or in addition to, the DSP 106. Thus, although the following description describes the DSP 106 performing the present invention, it is noted that the present invention may be performed by a general purpose microprocessor, or the present invention may be at least partially or totally implemented in digital or analog logic, as desired. The use of a programmable DSP 106 is the preferred embodiment of the invention.

Figure 2:
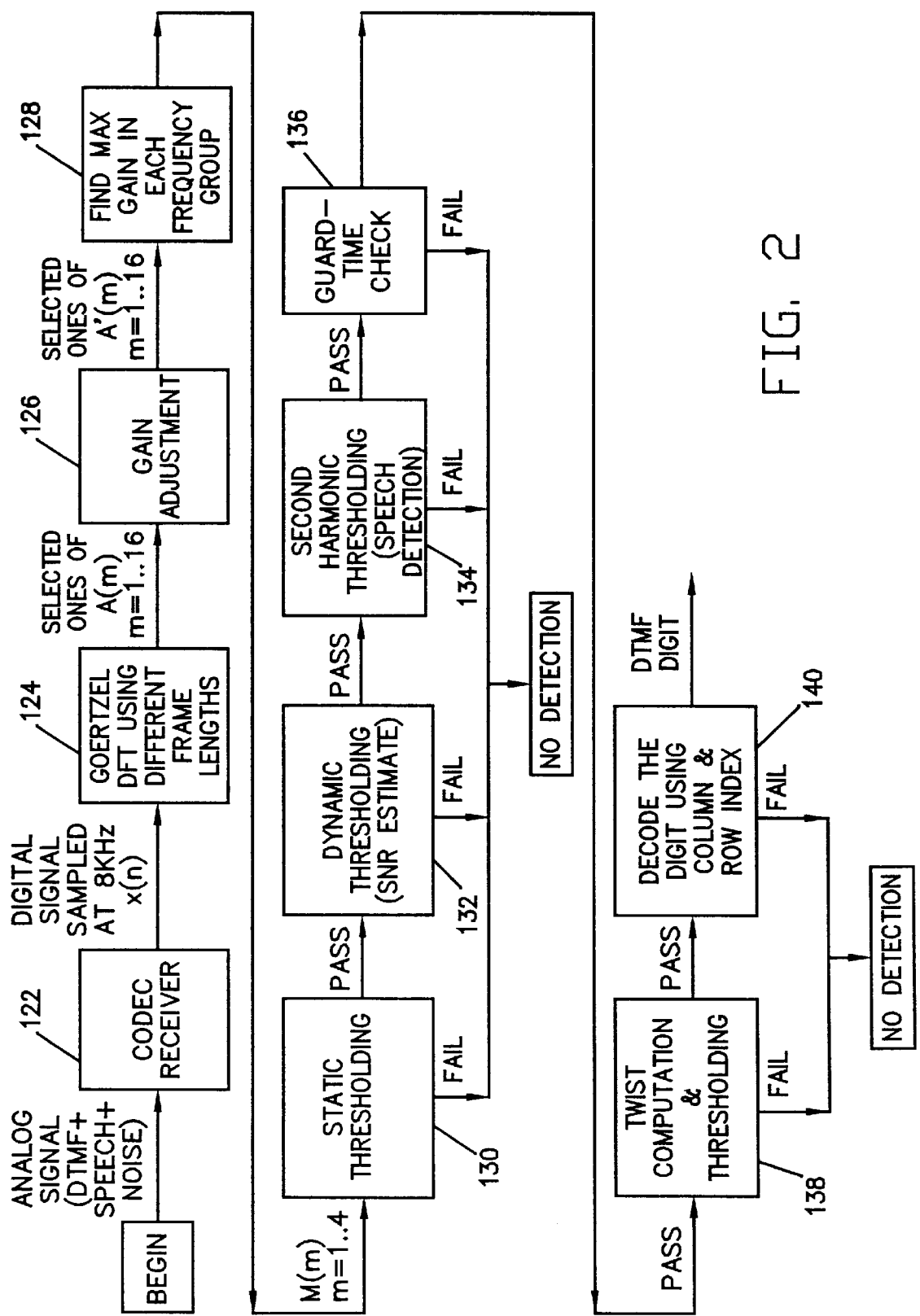
FIG. 2 is a flowchart diagram illustrating operation of the DTMF detector of the present invention.

FIG. 2—Flowchart Diagram

Referring now to FIG. 2, a flowchart diagram illustrating operation of the DTMF detector 102 according to the preferred embodiment of the present invention is shown. The DTMF detector 102 is coupled to a transmission media. As shown, the DTMF detector 102 receives an analog signal and determines whether dual tone multi frequency (DTMF) signals are comprised within the received signal. As shown, the received analog signal may comprise one or more of a DTMF signal, a speech or voice signal, or noise. In step 122, the codec 104 in the DTMF detector 102 receives the analog signal and converts the analog signal into digital format. In step 122 the codec receiver 104 preferably samples the analog signal at 8 kHz and performs pulse code modulation (PCM) or other suitable techniques to produce corresponding digital data. As shown, the codec receiver 104 produces a digital signal referred to as x(n), which is sampled at 8 kHz.

It is also noted that the received signal may be logarithmically compressed or companded, and thus step 122 may further comprise logarithmically expanding the compressed data to produce linear data.

The following comprises a brief description of steps 124–140, and a more detailed description of each of the steps follows. In step 124 the DSP 106 receives the digital signal x(n) from the codec 104 and performs the Goertzel DFT with reduced computational requirements according to the present invention. In step 124 the DSP 106 produces a plurality of energy values A(m) where m is one or more values from 1–16. The plurality of energy values A(m) comprise selected one or more energy values at each of the two sets of four frequency tones for the first and second harmonics of the frequencies. In step 126 the DSP 106 adjusts the gain of each of the energy values A(m) to compensate for differing energy content due to the differing frame lengths. The DSP 106 in step 126 produces a plurality of adjusted energy values A'(m). In step 128 the DSP 106 determines the maximum level of the energy values A'(m) in each frequency group.

In the following steps 130–138 the DSP 106 performs various tests to ensure valid tone detection. In steps 130 and 132 the DSP 106 performs static and dynamic thresholding, respectively, to ensure that the energy values A'(m) meet certain basic criteria. The static and dynamic thresholding performed in steps 130 and 132 eliminate invalid DTMF tones based on both signal level and signal/noise ratio.

After static and dynamic thresholding are performed in steps 130 and 132, in step 134 the DSP 106 performs second harmonic thresholding to prevent detection triggered by speech. The DTMF detector of the present invention examines the second harmonics of the fundamental DTMF frequencies using a ratio comparison method, which further distinguishes speech signals from DTMF signals.

In step 136 the DSP performs a guard time check to evaluate the frequency domain results and to ensure that the signal lasts at least a certain amount of time. The guard time check evaluates the maximum energy values in relation to prior and subsequent frames for improved detection. In step 138 the DSP performs twist computation and thresholding. In the preferred embodiment, the detector uses a novel twist computation technique which only performs the twist computation when the received signal is deemed stable, thus increasing accuracy. After the twist computation is performed in step 138, in step 140 the DSP decodes the digit using the column and row indices and outputs the pressed DTMF digit from the received DTMF signals. As noted in FIG. 2, if any of the steps 130–140 fail, then no detection is indicated.

Step 124—Goertzel DFT

Referring again to FIG. 2, in step 124 the DSP 106 receives the digital signal x(n) from the codec 104 and preferably performs the Goertzel DFT for one or more of the possible tone frequencies according to the present invention. According to the present invention, the DSP 106 performs the Goertzel DFT for at least a portion of the samples for each of the possible tone frequencies. The DSP 106 performs the complete Goertzel DFT for only a subset of the tone frequencies according to the present invention.

As discussed in the background section, decoding a DTMF signal involves detecting two tones in the received signal and then determining the number pressed by the user at the sending end based on the values of the detected tones. More generally, decoding a MTMF signal involves detecting a plurality of tones in the received signal. In the preferred embodiment, the system and method performs the Goertzel DFT for the possible tone frequencies with reduced computational requirements.

CCITT recommendations Q.23 and Q.24 in the "Red Book", Volume VI define two groups of frequencies that are used for in-band signaling. Group 1 comprises the frequencies 697 Hz, 770 Hz, 852 Hz, and 941 Hz, and these frequencies identify the rows of the telephone keypad, and Group 2 comprises the frequencies 1209 Hz, 1336 Hz, 1477 Hz and 1633 Hz, and these frequencies identify the columns of the telephone keypad. The DTMF signals each contain one row and one column frequency, and these signals are assigned using the following table.

TABLE 1

| DTMF frequency assignments | | | | |
|---|---|---|---|---|
| | 1209 Hz | 1336 Hz | 1477 Hz | 1633 Hz |
| 697 Hz | 1 | 2 | 3 | A |
| 770 Hz | 4 | 5 | 6 | B |
| 852 Hz | 7 | 8 | 9 | C |
| 941 Hz | * | 0 | # | D |

The detection of the dual tones is performed by mathematically transforming the input time domain signal into the frequency domain using various Fourier transform techniques. As is well-known, the discrete Fourier transform (DFT) is commonly used to transform discrete time domain signals into their discrete frequency domain components. As also noted in the background section, the Goertzel algorithm is a popular method for performing the DFT computation. The Goertzel algorithm offers the accuracy of a DFT-based calculation, while having increased computational efficiency that is comparable to narrow band filter-based algorithms.

Figure 3:
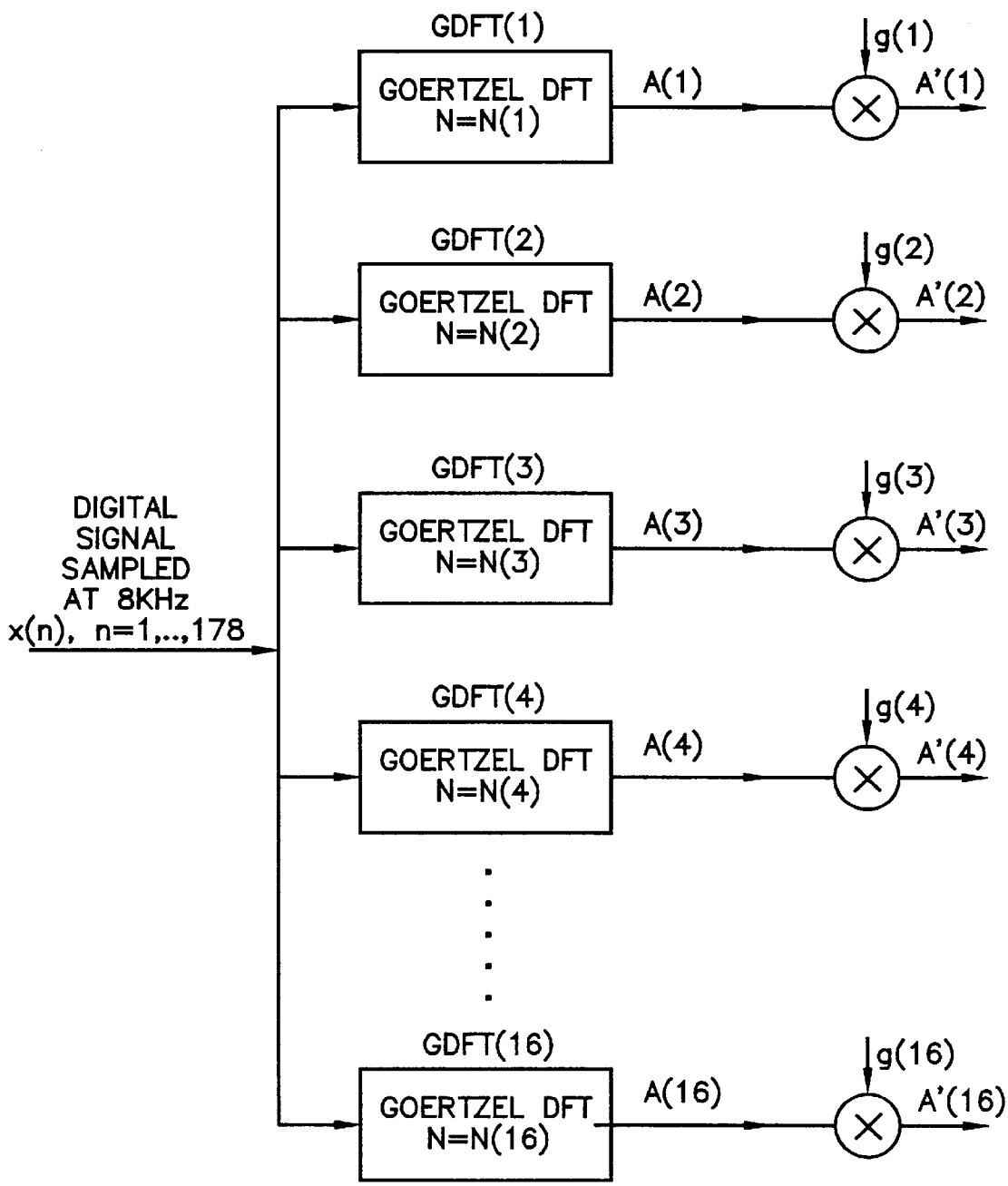
FIG. 3 illustrates a plurality of filters in the DTMF detector of FIG. 1, which apply the Goertzel algorithm.

As shown in FIG. 3, the operation of the DSP 106 is represented as 16 Goertzel DFT blocks labeled GDFT (1)–GDFT - (16). When each of the Goertzel GDFT blocks are fully performed, then each of the Goertzel GDFT blocks produces a respective value A(1)–A(16). The values A(1)–A(16) are comprised of four smaller sub-arrays. The output of each Goertzel DFT block is proportional to the square root of energy at the respective frequency. Thus the Goertzel DFT outputs comprise frequency domain values. In the preferred embodiment, the system computes the square of the frequency domain values to produce energy values, and the energy values are then used in subsequent computations.

The values A(1)–A(16) which are produced are each provided to respective multipliers which multiply the respective A(n) value with a respective gain. These multipliers correspond to the gain adjustment in step 126 of FIG. 2.

Figure 4:
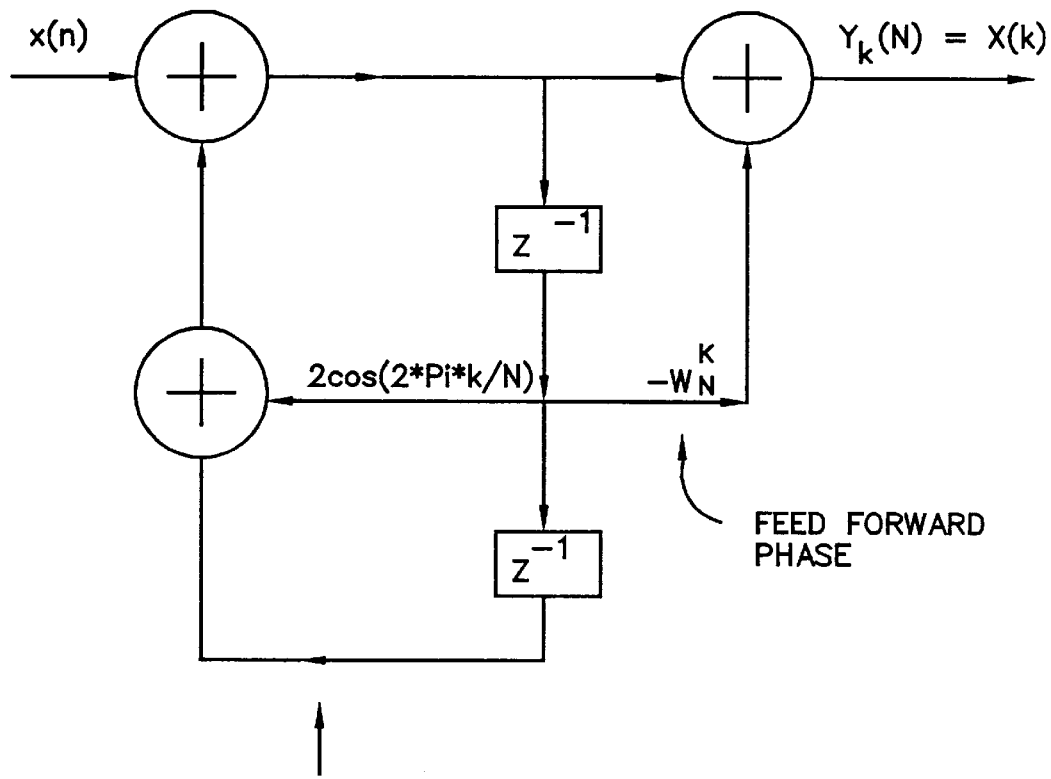
FIG. 4 illustrates operation of the Goertzel algorithm including feedback and feed forward stages.

Referring now to FIG. 4, a diagram illustrating operation of the Goertzel algorithm is shown. Operation of the Goertzel algorithm is similar to a filter implementation, wherein the Goertzel algorithm does not require a buffer of input data items prior to operation, but rather computes a new output result with each occurrence of a new input sample. As shown in FIG. 4, the Goertzel algorithm performs a second order recursive computation of the DFT by computing a new Yk(n) output for every new input sample x(n). The DFT result, referred to as X(k) is equivalent to Yk(n) when n=N, i.e., X(k)=Yk(N). As shown in FIG. 4, the operation of the Goertzel algorithm can be divided into two phases. The first phase involves computing the feedback legs in FIG. 4. The second phase computes the feed forward when n=N and thus evaluates the value X(k). As discussed further below, in the preferred embodiment of the invention the DSP 106 performs a portion of the Goertzel algorithm shown in FIG. 4, wherein a feed forward is performed at an earlier sample for the various DTMF frequency values.

The transfer function for the Goertzel algorithm feed-back phase is $$H_1(z) = \frac{1}{1 - 2\cos(2\pi k/N)z^{-1} + z^{-2}}$$

where $$z = e^{-j2\pi f/fs}$$

which operates on every sample in the frame. At the end of the frame, a feed-forward phase is computed using:

$$H_2(z) = 1 - W^*_N z^{-1} = 1 - e^{-j2\pi k/N} \cdot z^{-1}$$

Therefore, the overall transfer function for Goertzel algorithm is:

$$H(z) = H_1(z) \cdot H_2(z)$$
$$= \frac{1 - e^{-j2\pi k/N} \cdot z^{-1}}{1 - 2\cos(2\pi k/N)z^{-1} + z^{-2}}$$

This is a narrow band-pass filter and has a very sharp transition.

Variable Frame Size

In general, the conventional usage of the Goertzel algorithm is similar to the DFT method and is performed by computing frequency domain values at the desired discrete points. As a result, the Goertzel algorithm also has the disadvantage of the DFT, whereby the computed results may not be sufficiently close to the desired frequencies desired to be detected, thus severely reducing accuracy. This is referred to as the leakage effect. In other words, the DTMF detector 102 is designed to detect dual tones which will occur at specified predefined frequencies. In the preferred embodiment, these frequencies are 697 Hz, 770 Hz, 852 Hz, 941 Hz, 1209 Hz, 1336 Hz, 1477 Hz, and 1633 Hz. The frequencies used in the DTMF standard are not spaced at equal increments but rather are deliberately designed to be uncorrelated for more accurate detection.

As a result, if the conventional method of a fixed N (frame size) is used in the Goertzel algorithm, the frequencies are not optimally aligned at the frequency bins. The effect is that the desired outputs are not exactly at the frequency bins (multiples of Fs/N). This causes the energy to be distributed among neighboring frequency bins, referred to as leakage. Leakage can severely degrade the accuracy of the frequency domain outputs. The following table illustrates the effect of leakage using an example of the Goertzel algorithm for DTMF frequency 852 Hz (N=205).

TABLE 2

| The effect of leakage | | | | | | |
|---|---|---|---|---|---|---|
| error in K (%) | 0.01 | 0.05 | 0.1 | 0.5 | 1.0 | 5.0 |
| output gain (dB) | 94.0 | 80.6 | 74.7 | 60.9 | 49.6 | 43.6 |
| output error (dB) | | >13.4 | >19.3 | >33.1 | >44.4 | >50.4 |

Note: K = N*f/fs

In general, it has been found that a fixed-frame size of 205 points produces the least error in a Goertzel/DFT computation. In one embodiment, the DSP applies the Goertzel algorithm utilizing a fixed frame size, preferably a fixed-frame size of 205 points. In the preferred embodiment, the DSP 106 performs the Goertzel algorithm utilizing a varying or differing frame size N for a plurality of the DTMF frequencies to provide increased accuracy and efficiency. The DTMF detector 102 of the present invention preferably uses a different frame size for different DTMF tone frequencies and then adjusts the gain after the frequency domain values have been computed. This provides increased accuracy and speed over prior art methods. For more information on the use of a variable or differing frame size, please see related application Ser. No. 08/563,973 titled "System and Method for Dual Tone Multi-frequency Detection Using Variable Frame Widths", and filed Nov. 29, 1995, which is hereby incorporated by reference in its entirety.

Referring again to FIG. 2, in step 124 the DSP 106 performs the complete Goertzel DFT method for at least one or more of the tone frequencies. As shown, the DSP 106 receives a digital signal referred to as x(n), wherein the digital signal x(n) comprises a plurality of samples of a received signal. Referring now to FIG. 3, the DSP effectively computes one or more of a possible 16 Goertzel DFTs with different frame lengths N(1)–N(16). The different frame lengths for each of the Goertzel DFTs are preferably as follows:

N(1), N(9)=172;
N(2), N(10)=177;
N(3), N(11)=178;
N(4), N(12)=178;
N(5), N(13)=172;
N(6), N(14)=168
N(7), N(15)=168
N(8), N(16)=176

Figure 5:
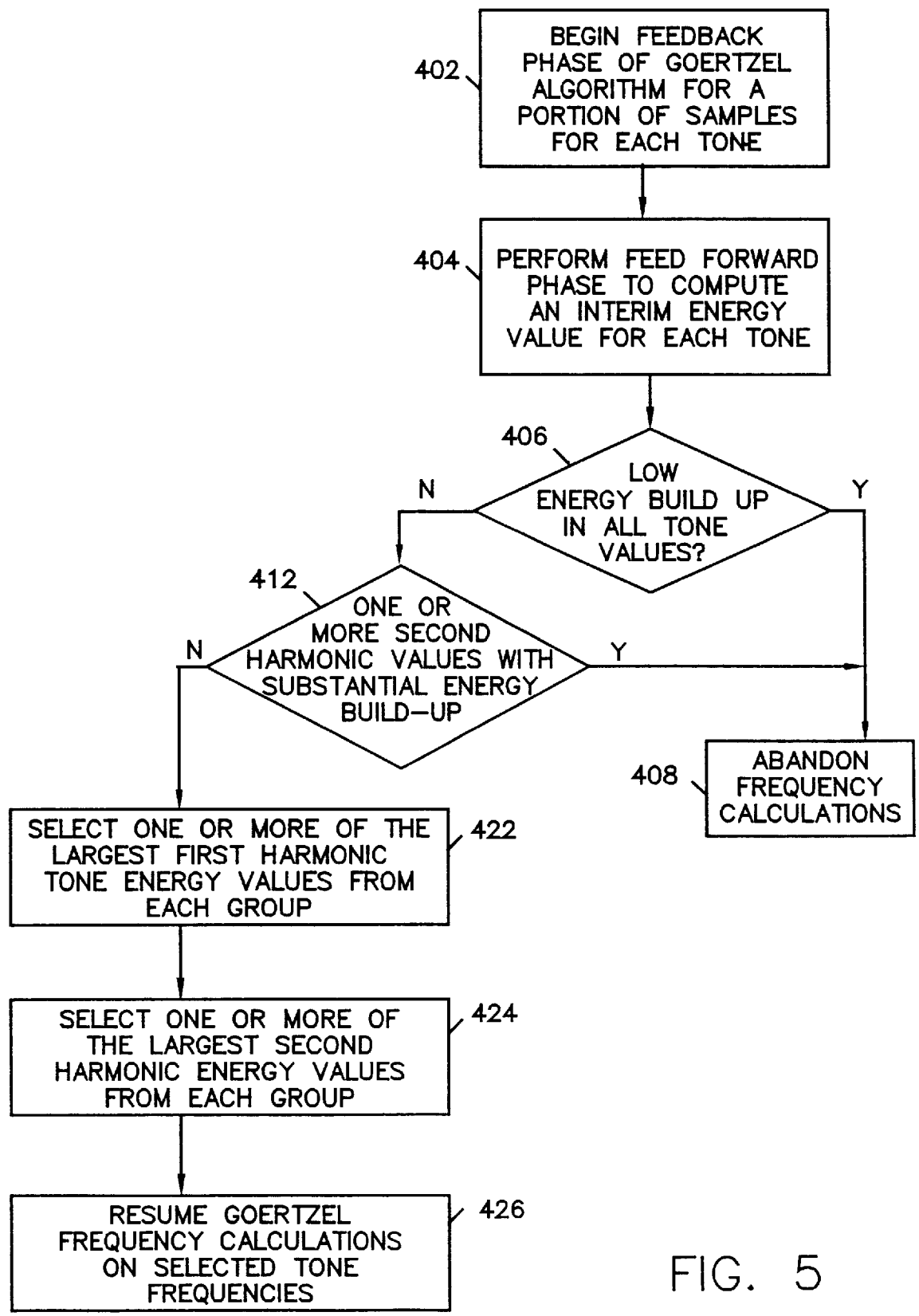
FIG. 5 is a flowchart diagram illustrating computation of the Goertzel algorithm with reduced computational requirements according to the present invention.

FIG. 5—Goertzel DFT Computation According to the Present Invention

Referring now to FIG. 5, a flowchart diagram illustrating operation of a method for computing energy values for each of the DTMF tones with reduced computational requirements according to the present invention is shown. As shown, in step 402 the DTMF detector begins the feedback phase of the Goertzel algorithm for each of the plurality of possible tones. The feedback phase of the Goertzel algorithm is shown in FIG. 4 as described above. In the preferred embodiment, the system begins the feedback phase of the Goertzel algorithm for each of the possible DTMF frequencies including both the first harmonics of these frequencies and the second harmonics of these frequencies In a DTMF embodiment which includes standard dual-tone multi-frequency values as discussed above, the DTMF phase begins the feedback phase of the Goertzel algorithm for 16 different frequencies, these being four frequencies each for the row and column tones, as well as four frequencies each for the second harmonic of these respective tones. It is noted that in an MTMF embodiment, the detector preferably begins the feedback phase of the Goertzel algorithm for all of the possible frequencies.

After a certain number N' of samples have been calculated in the feedback phase of the Goertzel algorithm in step 402 for each frequency, in step 404 the detector performs a feed forward energy calculation to produce an interim energy value for each of the frequencies. The feed forward phase is shown in FIG. 4 as discussed above. This also operates to halt the computation of the feedback phase of the Goertzel algorithm. In the preferred embodiment, the number N' of samples used for the initial or first portion of the Goertzel algorithm is preferably different for each frequency.

Thus, at a certain point during the computation of each of the energy values for the respective tones, such as at or near the halfway point, the detector halts the feedback phase computation and performs a single feed forward energy calculation to produce an interim energy value for each of the frequencies. These interim energy values provide an indication of the amount of energy built up during the first portion of the calculation of the Goertzel algorithm. Thus, step 404 essentially amounts to a "snoop ahead" of the energy values that will be received during full computation of the Goertzel algorithm.

In the preferred embodiment, the different intermediate or interim frame lengths N' for each of the Goertzel DFTs are preferably optimized to align on the respective bins. The table below describes the different intermediate or interim frame or sample sizes N' used according to the preferred embodiment of the invention for the different DTMF tone frequencies, as well as the associated K values.

| Standard DTMF Frequency (Hz) | N' | K (fl-pnt) | K (integer) | Absolute error of K | % error of K |
|---|---|---|---|---|---|
| 697 Hz | 69 | 6.011 | 6 | 0.011 | 0.19% |
| 770 | 83 | 7.988 | 8 | 0.012 | 0.14% |
| 852 | 75 | 7.988 | 8 | 0.012 | 0.15% |
| 941 | 85 | 9.998 | 10 | 0.002 | 0.02% |
| 1209 | 86 | 12.996 | 13 | 0.004 | 0.02% |
| 1336 | 84 | 14.028 | 14 | 0.028 | 0.2% |
| 1477 | 81 | 14.954 | 15 | 0.046 | 0.3% |
| 1633 | 88 | 17.963 | 18 | 0.037 | 0.2% |

In step 406 the DTMF detector determines if no substantial energy build up has occurred in each of the tone frequencies, i.e., at each of the frequency bins. If the energy build up for each of the possible frequencies is substantially equivalent and is also uniformly low, then it can be assumed that no DTMF tones are present in the frame being analyzed. In the preferred embodiment, the DTMF detector determines that there is no substantial energy build up in any of the tone frequencies if the accumulated energy in each value is less than a threshold referred to as Tint1. The Tint1 value is preferably system-dependent and/or standards-dependent and is determined in part by examining the dynamic range of the codec. In this case if there is no substantial energy build up in any of the tones, in step 408 the DTMF detector abandons the Goertzel computation for all of the tones, and operation completes. Thus, after this interim calculation in step 404, if the detector determines in step 406 that there is no energy build up in any of the tone frequencies, and thus there are no DTMF tones within the frame, calculations are halted, i.e., not resumed, on this frame. This results in a substantial computational savings. In other words, the remaining portion of the Goertzel algorithm is not required to be performed for any of the possible tones, thus resulting in reduced computation time as compared to prior art methods. If there is some accumulated energy build up in one or more of the tone frequencies, then operation advances to step 412.

In step 412 the DTMF detector determines if there is substantial energy build up in one or more of the second harmonic energy values of the possible tone frequencies. As discussed above, a real DTMF signal is the sum of two sinusoids and has two steep peaks in the frequency domain. Thus, a real DTMF signal does not have significant energy at second or higher harmonics. Speech on the other hand generally always has a significant amount of energy at the second and higher harmonics. This characteristic of speech makes it easier to distinguish speech from DTMF signal. Thus the DTMF detector 102 examines the second harmonics of the fundamental DTMF frequency in step 412. The DTMF detector determines that there is substantial energy build-up in one or more of the second harmonics energy values if at least one of the second harmonics energy values has accumulated energy greater than a threshold referred to as Tint2. The threshold value Tint2 is also system-dependent and/or standards-dependent and is determined in part by examining the dynamic range of the codec.

In general, if a substantial amount of energy has built up during the initial portion of the Goertzel algorithm for any one or more of the second harmonic frequencies, this indicates that the energy being detected in the respective frame is actually a voice signal as opposed to a tone signal. This also indicates that any detected DTMF tone in this frame is likely to be discarded due to a failure to pass the second harmonic thresholding test performed in step 134 as described above. Thus, in step 412 if any one or more of the second harmonic frequencies has a substantial energy build up, then in step 408 the Goertzel algorithm computation for this frame is abandoned, and operation completes.

Thus, steps 406 and 408 essentially perform determinations on the interim energy values using only a portion of the Goertzel computation. If it is evident from a first portion of the Goertzel algorithm computation that a DTMF tone will not be detected and/or one or more threshold tests will not be satisfied, then the Goertzel algorithm computation is abandoned, thus saving computational cycles and increasing system performance. If the frequency energy computations are abandoned in step 408 due to a low energy build-up, then the DTMF detector either immediately begins computations on the remaining samples of the frame, i.e., repeats steps 402–412 beginning with the remaining samples of the frame, or waits for the start of the next frame to repeat these steps, as discussed below. If there is energy build up in at least one of the DTMF tones and generally no substantial energy build up in one or more of the second harmonic values, then operation proceeds to step 422.

In step 422 the DTMF detector selects one or more of the largest energy values from each of the tone groups. In a DTMF embodiment, the detector selects one or more of the largest energy values from each of the row and column frequency groups. If only static thresholding is performed by the DTMF detector, then the detector preferably selects only the largest energy value from each of the frequency groups. In this case, the DTMF detection completes the Goertzel computation for this largest energy value and simply performs a static threshold against that single energy value. If dynamic thresholding is being performed by the DTMF detector, as described in step 132 above, then the detector preferably selects the two largest energy values from each of the tone frequency groups. Selecting the two largest energy values from each of the frequency groups allows the DTMF detector to later compute the ratio of the resultant largest energy value to the next largest value after full computation of the Goertzel algorithm, thus computing a signal to noise ratio estimate as described above.

In step 424 the detector selects the largest second harmonic from each of the tone frequency groups. In the preferred embodiment, the detector only selects the one largest second harmonic from each group. This one second harmonic is selected from each group to enable second harmonic thresholding to be performed in step 134.

In step 426 the detector continues, i.e., resumes the computation of the Goertzel calculation on only the selected frequencies in step 422 and step 424. Thus, the detector of the present invention performs an interim calculation of energy values for each of the possible tones, selects the one or more largest tone energy values from each group, and then only completes the full Goertzel algorithm computation for these largest values. Thus, the DTMF detector does not complete the Goertzel algorithm computation for the tone frequencies which have low interim energy values. This results in considerable computational savings of the DTMF detector according to the present invention.

Figure 6:
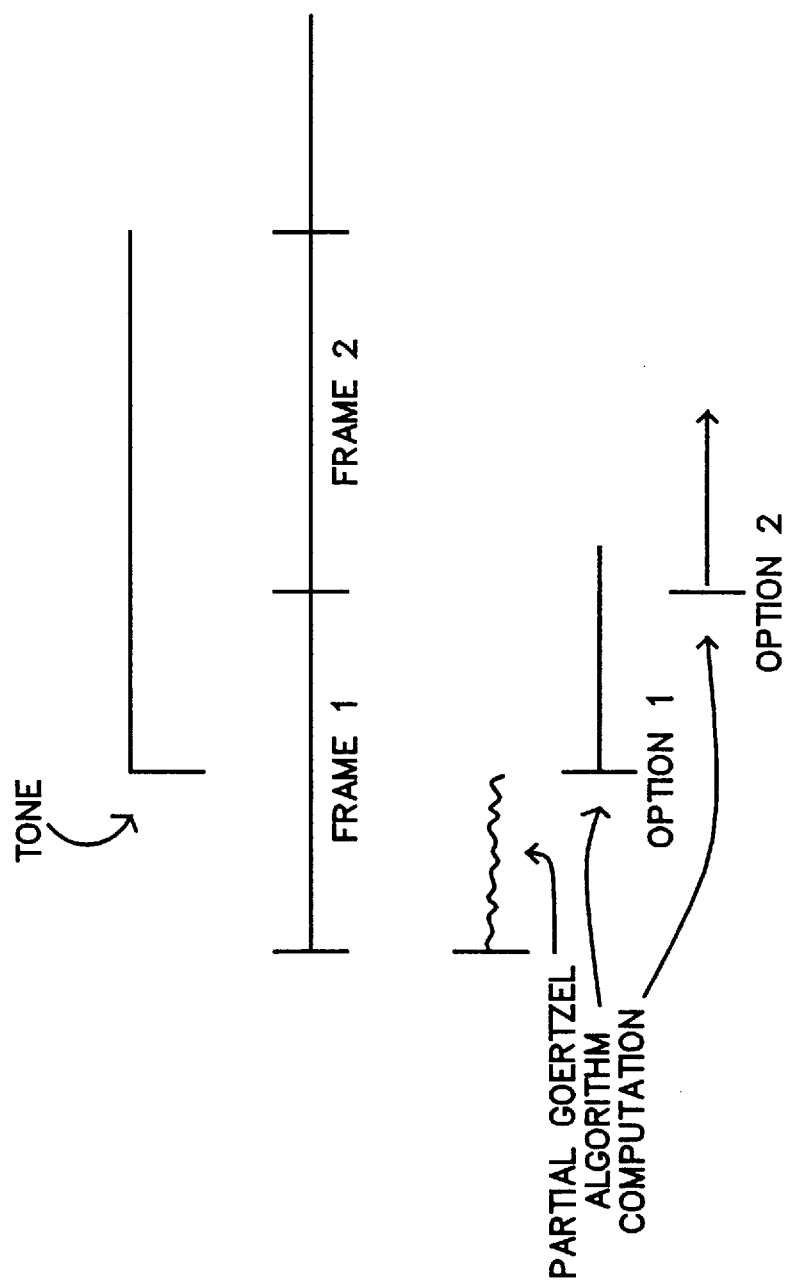
FIG. 6 illustrates possible Goertzel algorithm computation alternatives when a tone begins in the middle of a frame.

Referring now to FIG. 6, when the DTMF detector system and method abandons the entire Goertzel algorithm search in frame 1 in step 408, due to either no energy build up in any of the tones or a substantial second harmonic energy, in one embodiment, referred to as "option 2", the DTMF detector performs no further calculations until the beginning of the next frame of speech data, which is frame 2 in FIG. 6. In an alternate embodiment of the invention, referred to as "option 1", the DTMF detector immediately restarts the computation of the Goertzel algorithm at the "next" sample of frame 1 and performs the operations described above in FIG. 5. Thus, as shown in FIG. 6, if a tone begins halfway through a speech frame, the interim calculation performed at the beginning of frame 1 in step 404 will generally show no energy build up in any of the tones. If the Goertzel algorithm computation is immediately restarted approximately midway through the frame for each of the tones, which is the "option 1" embodiment, this computation will detect the beginning of the tone and thus provide earlier detection of the tone.

In the "option 2" embodiment where the Goertzel algorithm waits until the start of the next frame to begin Goertzel algorithm computations, the DTMF detector will also be able to detect the tone, which typically lasts one or more frames. However, this detection will be later in time than the "option 1" embodiment, which immediately restarts computation of the Goertzel algorithm midway through a frame where a computation has been abandoned.

After the Goertzel DFT is applied to the received digital signal in step 124, the result is a plurality of frequency spectra values A(m) corresponding to one or more of the 8 DTMF standard frequencies or tones for the first and second harmonics. In the preferred embodiment, either the Goertzel calculation is abandoned, or the result is 2 first harmonic energy values for each of the row and column, as well as 1 second harmonic energy value for each of the row and column. Thus, the full Goertzel calculation is only performed for 6 energy values, as opposed to 16 energy calculations required in the prior art. Also, the remainder of the computations after step 124, require less processing requirements.

Step 126—Gain Adjustment

In step 126 the DSP 106 preferably performs gain adjustment, as shown in FIG. 3. Calculating the frequency spectrum using different frame lengths N produces differing energy contents in a plurality of the energy values. Thus the DTMF detector 102 preferably multiplies a gain value with each of the energy values to adjust the gain of each of the energy values. It is noted that using differing frame widths provides better results even without gain adjustment. However, gain adjustment is desirable since different frame lengths have been applied to different frequencies and also because different Goertzel algorithm transfer functions have different gains at the narrow pass band. Thus the system and method of the preferred embodiment preferably adjusts the gain in order to more correctly evaluate the results in the array A[1 ... 16]. After the gain adjustment in step 126, the result is a modified frequency spectra values A'(m).

The gains were computed using mathematical methods and also verified using laboratory methods. The gain adjustments used in the preferred embodiment are listed below:

| Freq (Hz): | Gain factor: |
| --- | --- |
| 697 | 1.00000000 |
| 770 | 0.98902064 |
| 852 | 0.97439963 |
| 941 | 0.97849229 |
| 1209 | 1.00475907 |
| 1336 | 1.03484721 |
| 1477 | 1.02940728 |
| 1633 | 0.99550578 |

In the preferred embodiment, the DTMF detector 102 does not use the second harmonic outputs for computing twist. Therefore, gain adjustment for the second harmonics is less important. Thus, in the preferred embodiment, gain adjustment for the second harmonics is not performed in order to save computational resources. Assuming the gain factor for frequency F1 is G1, then the gain adjustment is calculated by performing:

$$A'(1) = G1 * A(1)$$

This is performed on the one or more outputs received of the first eight elements in the Goertzel output array A[1, ... ,8], i.e., the first harmonics, and one or more new values of the array A'[1, ... ,16] is generated. The new values comprise the gain adjusted Goertzel DFT output. It is noted that second harmonics energy outputs are not adjusted, and thus these values remain the same, i.e., A'[9 ... 16]=A[9 ... 16].

Step 128—Determining the Maximum Gain in Each Frequency Group

As noted above, the gain adjustment performed in step 126 produces one or more values of the first and second harmonics of the row and column frequencies of the DTMF standard frequencies. As noted above, the array A'[1, . . . ,16] is comprised of four smaller arrays. Sub-array A'[1, . . . ,4] comprises the values for the fundamental row frequencies and determines the row to which the pushed key belongs. Sub-array A'[5, . . . ,8] comprises the values for the fundamental column frequencies and determines the column to which the pushed key belongs. The sub-array A'[9, . . . ,12] comprises the DFT values for the second harmonics of the row frequencies, and the sub-array A'[13, . . . ,16] comprises the values for the second harmonics for the column frequencies. The gain adjustment in step 126 produces one or more values from each of the first two sub-arrays A'[1, . . . ,4] and A'[5, . . . ,8], preferably two values from each sub-array, and zero or more values from the latter two sub-arrays A'[9, . . . ,12] and A'[13, . . . ,16], preferably one value from each of these sub-arrays.

Figure 7:
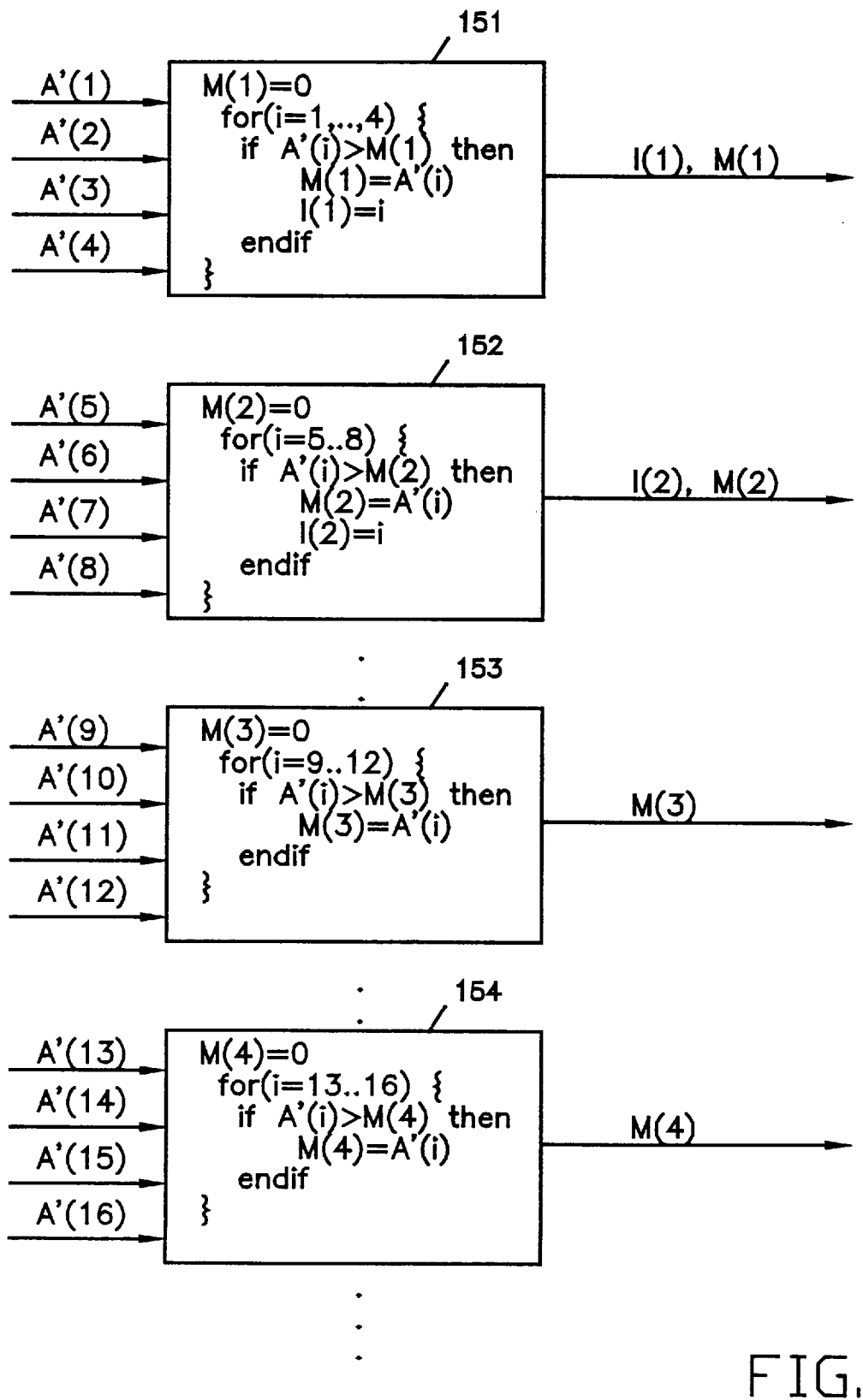
FIG. 7 is a block diagram illustrating logic which finds the maximum gain in each group of detected tones.

Referring now to FIG. 7, a block diagram is shown illustrating operation of step 128 in FIG. 2. As shown in FIG. 5, operation of the DSP 106 is represented as four blocks 151, 152, 153, and 154, wherein each of the blocks determines the value in the respective sub-array that has the maximum value or gain. The blocks 151 and 152 for the two first harmonic sub-arrays also obtain the respective index of the maximum gain value. The blocks 151 and 152 for the sub-arrays A'[1, . . . ,4] and A'[5, . . . ,8] each provide outputs comprising the maximum value in the sub-array and the respective index. The blocks 153 and 154 for the sub-arrays A'[9, . . . ,12] and A'[13, . . . ,16] provide outputs comprising the respective maximum values in each of the sub-arrays.

Thus in step 128 the DSP 106 determines the maximum value in the first two sub-arrays and the respective indices within the sub-array. It is noted that each of the blocks in FIG. 7 actually only receives one or more inputs from each sub-array, depending on which energy values were selected in steps 422 and 424. This step can be described using pseudo code:

```
M[1]= 0; I[1]= 0;
for(i = 1 to 4) {
        ifA'[i] > M[1] then
                M[1] = A'[i];
                I[1] = i;
        endif
}
M[2] = 0; I[2]= 0;
for (i = 5 to 8) {
        ifA'[i] > M[2] then
                M[2] = A'[i];
                I[2] = i;
        endif
}
```

Thus, in step 128 the DSP 106 obtains the maximum values of the row and column frequency group (M[1], M[2]) and their respective index (I[1], I[2]) for the first harmonic sub-arrays. In the preferred embodiment, the DSP 106 does not determine the indices for the second harmonics. Rather the DSP 106 only obtains the maximum frequency output for the second harmonics of the row frequency, M[3], and the maximum frequency output for the second harmonics of the column frequency, M[4], as shown in FIG. 5.

Steps 130 and 132—Static and Dynamic Thresholding

The system and method of the preferred embodiment performs both static thresholding and dynamic thresholding. The static thresholding compares the maximum energy value to a static threshold value. Thus the static thresholding ensures that the signal level is greater than a certain minimum value. The dynamic thresholding in step 132 essentially performs a signal/noise ratio estimate. The dynamic threshold performed in step 132 performs a threshold comparison with the computed signal/noise ratio, which effectively prevents noise or speech-triggered detection, i.e., provides better speech immunity.

In the preferred embodiment, as discussed above, the full Goertzel algorithm is only performed for two frequencies of each group. Thus the dynamic threshold uses the ratio between the maximum value in the group and the other value in the group or sub-array. Since the DSP 106 selects the two largest energy values in step 422, one of these energy values will become the largest or maximum energy value after the full Goertzel computation, and the remaining energy value would presumably have been the second largest of all of the remaining values if a full Goertzel computation had been performed for all of the frequencies of the respective group. It is noted that, if only static thresholding is performed, then the DSP 106 is only required to select one largest first harmonic tone energy value in step 422 of FIG. 5, since a second value is not needed for a ratio comparison.

The static and dynamic thresholding improves the DTMF detector's functional dynamic range and noise immunity. The performance of both static and dynamic thresholding thus increases the functional input signal dynamic range and has greater speech/noise immunity, i.e., is more able to avoid detection triggered by speech or noise. The static and dynamic thresholding performed in steps 130 and 132 eliminate invalid DTMF tones based on both signal level and signal/noise ratio. The use of both static and dynamic thresholding also allows a small static threshold to be selected, thus providing the DTMF detector with a wider dynamic range.

Figure 8:
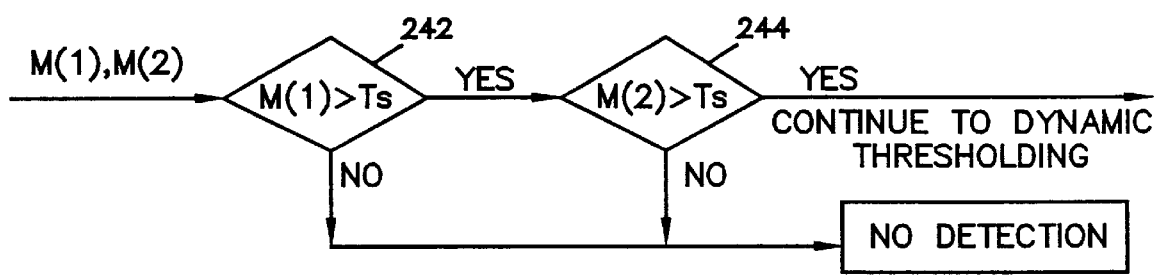
FIG. 8 illustrates operation of static thresholding in the flowchart diagram of FIG. 2.

Referring now to FIG. 8, a flowchart diagram illustrating operation of the static thresholding step 130 is shown in FIG. 1. As shown, the maximum values from the first two sub-arrays corresponding to the first harmonic row and column frequency values are received in the static thresholding step 130. As shown, in step 242 the DSP 106 determines if M(1)>Ts, i.e., if the maximum value of the first sub-array is greater than Ts. If not, then no detection occurs and operation completes. If M(1)>Ts in step 242, then in step 244 the DSP determines if the value M(2) is greater than Ts. If not, then again no detection is determined. If both M(1) and M(2) are greater than the threshold value Ts, then dynamic thresholding is performed on these values in step 132 of FIG. 2.

Figure 9:
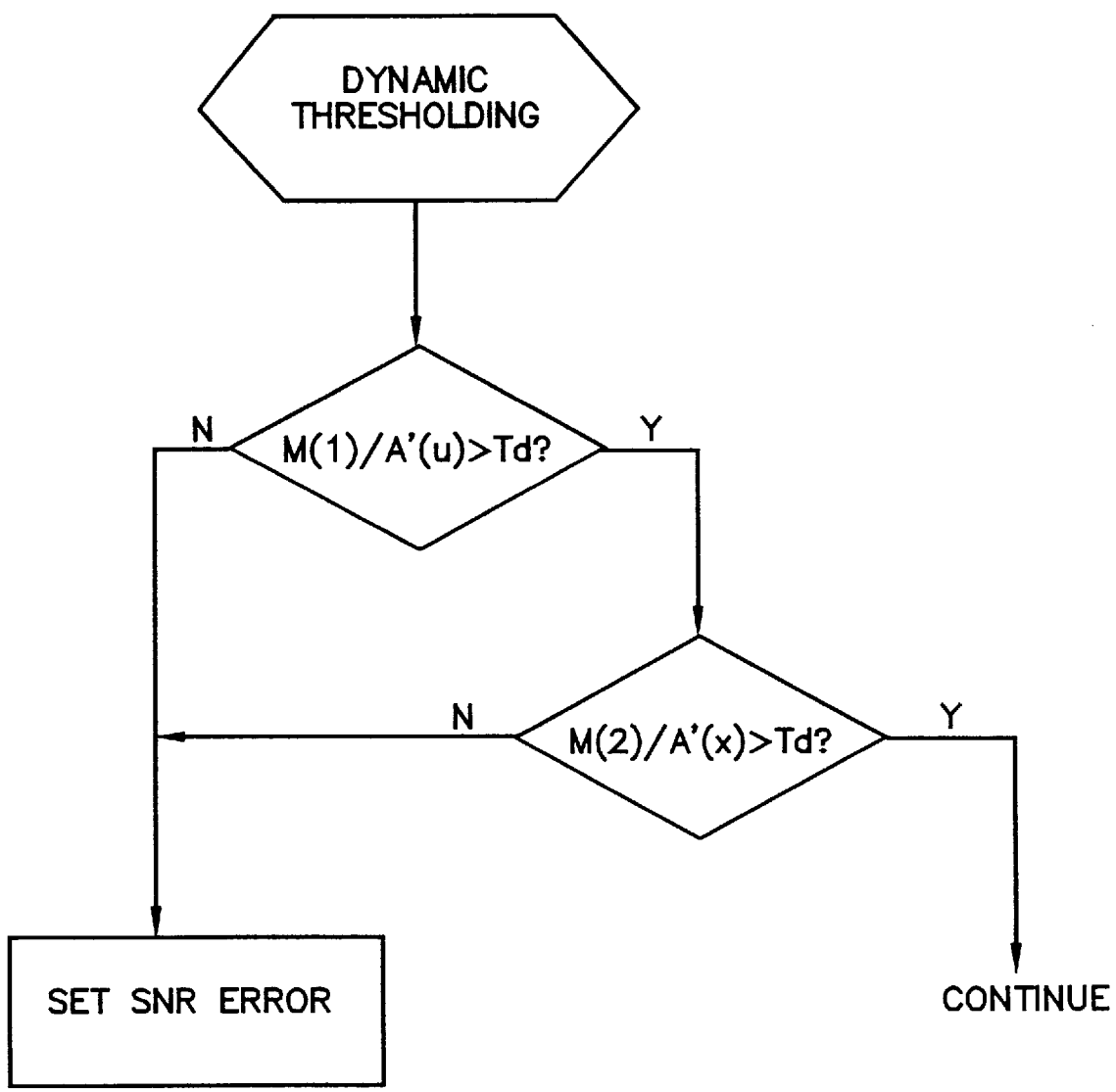
FIG. 9 illustrates operation of the dynamic thresholding in the flowchart diagram of FIG. 2.

Referring now to FIG. 9, the dynamic thresholding step 132 is shown. As shown, the dynamic thresholding step computes signal to noise ratios using ratios of the maximum energy values M(1) and M(2) to the selected one of the other energy values in each respective group.

As shown, the DSP 106 computes the ratio of the maximum value M(1) in the first sub-array to the one other computed value in the first sub-array, referred to as A'[u]. This other value in the sub-array comprises the other of the two values selected in step 422 from the first sub-array which did not become the maximum or M(1) value. Likewise, the DSP 106 computes the ratio of the maximum value M(2) in the second sub-array to the one other value in the second sub-array, referred to as A'[x]. This other value in the sub-array comprises the other of the two values selected in step 422 from the second sub-array which did not become the maximum or M(2) value.

Thus the dynamic thresholding step computes the ratio of the maximum value M(1) in the first sub-array to the other selected value in the sub-array, i.e., the selected one of the values of A'[1], A'[2], A'[3] and A'[4], excluding the maximum of these values, which is referred to as M(1). Likewise, the dynamic thresholding step computes the ratio of the maximum value M(2) in the second sub-array to the other selected value in the sub-array, i.e., the selected one of the values of A'[5], A'[6], A'[7] and A'[8], excluding the maximum of these values, which is referred to as M(2).

The dynamic thresholding step compares the above computed ratios with a threshold value Td. The ratio of the maximum value in a respective sub-array to the other value in the respective sub-array essentially computes the signal to noise ratio (SNR) of the received signals. The dynamic thresholding ensures that the ratio of the maximum value M(1) in the first sub-array to the other computed value in the first sub-array, i.e., the signal to noise ratio, is greater than the threshold value Td. Likewise, the dynamic thresholding ensures that the ratio of the maximum value M(2) in the second sub-array to the other computed value in the second sub-array, i.e., the signal to noise ratio, is greater than the threshold value Td. If the ratio of the maximum value in a sub-array to the other computed value in the sub-array is not greater than the threshold value Td, the DSP 106 sets a signal/noise ratio error, and thus no detection is indicated.

In an alternate embodiment, where a greater number of tone frequencies are selected for a full Goertzel algorithm to be performed in step 422, the DSP 106 preferably computes the ratio of the maximum value M in the respective sub-array to each of the one or more other computed values in the respective sub-array. These other values in the sub-array comprise the values in the sub-array other than the maximum value where a full Goertzel algorithm has been computed.

Because $Td = 10^{(required\ SNR\ in\ dB/20)}$, setting the SNR error means that either or both the column and row frequency values do not meet the required SNR. If the SNR error is set, no detection is indicated. In one embodiment where the standard requires a SNR of 12 dB, the dynamic threshold Td is preferably set to ensure that M(1) is at least four times as big as the other computed value in the respective first sub-array, and that M(2) is at least four times as big as the other computed value in the respective second sub-array.

Thus selected ones of the frequency domain values (A'[1, . . . ,16]) obtained through the Goertzel algorithm and gain adjustment are compared against thresholds using both static and dynamic techniques. In the preferred embodiment, the static threshold is set to 6 (which provides a theoretical functional dynamic range of over 50 dB) and the dynamic threshold is set to 4 (about 12 dB). This allows very small DTMF signals (wide dynamic range) to be detected, as long as the signals have an acceptable signal to noise ratio. This also effectively eliminates most idle channel noise, speech, and white noise.

Step 134—Second Harmonic Thresholding

In step 134, the DSP 106 performs second harmonic thresholding to further examine the validity of the detected tones and eliminate speech triggered DTMF detection. This occurs before DTMF detection and usually is a continuous task for the DSP 106, even after the channel has been established. The human voice, especially the female voice, can have a large amount of energy components over 1000 Hz and can be mistaken as DTMF signal. Some music can also trigger DTMF detection. Thus speech detection and/or speech immunity is a very important criteria for evaluating the quality of a DTMF detector.

As discussed above, a real DTMF signal is the sum of two sinusoids and has two steep peaks in the frequency domain. Thus, a real DTMF signal does not have significant energy at second or higher harmonics. Speech on the other hand generally always has a significant amount of energy at the second and higher harmonics. This characteristic of speech makes it easier to distinguish speech from a DTMF signal. Thus the DTMF detector 102 examines the second harmonics of the fundamental DTMF frequency.

Prior art methods have conventionally examined the value of the second harmonics, A'[9, . . . ,16]. According to the preferred embodiment, the DSP 106 compares the selected second harmonic value with the selected values at the fundamental harmonics, A'[1, . . . ,8]. The DSP 106 computes the ratio of M[1]/M[3] and M[2]/M[4], and compares the results with a pre-set threshold.

It is noted that the ratio A'[i]/A'[i+8] (assuming A'[i] is the biggest value in its group) is not used because, if the speech has some energy at a frequency x% away from the bin, its second harmonic will have a distance of 2x% from the second harmonic bin. Therefore, the DSP 106 uses the maximum value in the second harmonic group to provide an estimate of the energy at the second harmonics. This is beneficial to talk-off performance of the DTMF detector.

Figure 10:
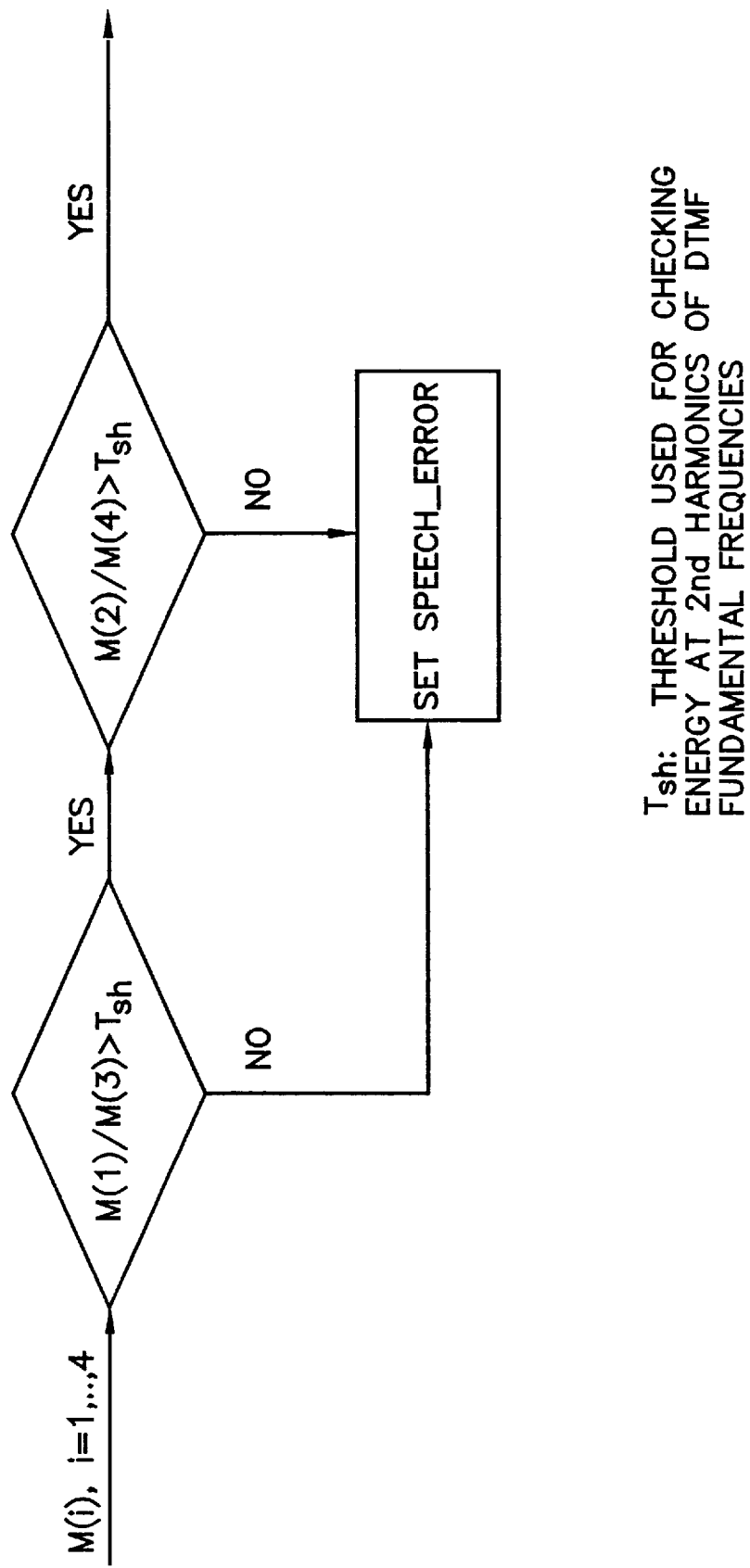
FIG. 10 illustrates operation of the second harmonic energy threshold check in the flowchart of FIG. 2.

Referring now to FIG. 10, a flowchart diagram illustrating operation of the second harmonic thresholding performed in step 134 of FIG. 2 is shown. As shown, in FIG. 10 the DSP 106 compares the ratio of the maximum values of the first and second harmonics, M1/M3, with the threshold value Tsh, and also compares the ratio of the maximum values of the first and second harmonics of the column frequency, i.e., the ratio M2/M4, and determines if this value is greater than the threshold Tsh. If either of the ratios M1/M3 or M2/M4 are not greater than the threshold Tsh, then a speech error signal is generated indicating that the detected signal actually corresponds to speech and not to a DTMF signal.

Step 136—Guard Time Check

The present invention discloses an improved guard time check method which overcomes the difficulty of meeting the guard-time performance requirement when using frame based processing methods (such as the Goertzel algorithm). The present invention also uses a larger cut-off duration value (but less than T1) as described below. A larger cut-off duration value provides better talk-off performance for the DTMF detector. This is because speech triggered 'fake DTMF signals' tend to have a short duration, while also having a frequency domain energy presentation which appears like a DTMF signal.

The guard-time parameter requires that all DTMF signals having a duration longer than T1 be detected as valid DTMF tones, i.e., no misses are allowed), whereas all DTMF signals shorter than T2 (T2<T1) can not be detected as valid DTMF signals. All tones have a duration between T1 and T2 are 'don't care' which means the detector has the flexibility to either detect or miss the signal. In general, it is deemed desirable to have a fixed cut-off value to warrant the guard-time performance.

The AT&T standard, and most other standards, require that any DTMF sequence longer than 40 ms must be accepted if it meets all other criteria. A DTMF sequence shorter than 20 ms should never be detected. Since the DTMF detector 102 of the preferred embodiment processes the speech sample as blocks, the DTMF detector 102 compares the maximum values ( M[1] and M[2]) with the values from the previous and next frame to determine if the DTMF signal lasts at least 40 ms.

Figure 11:
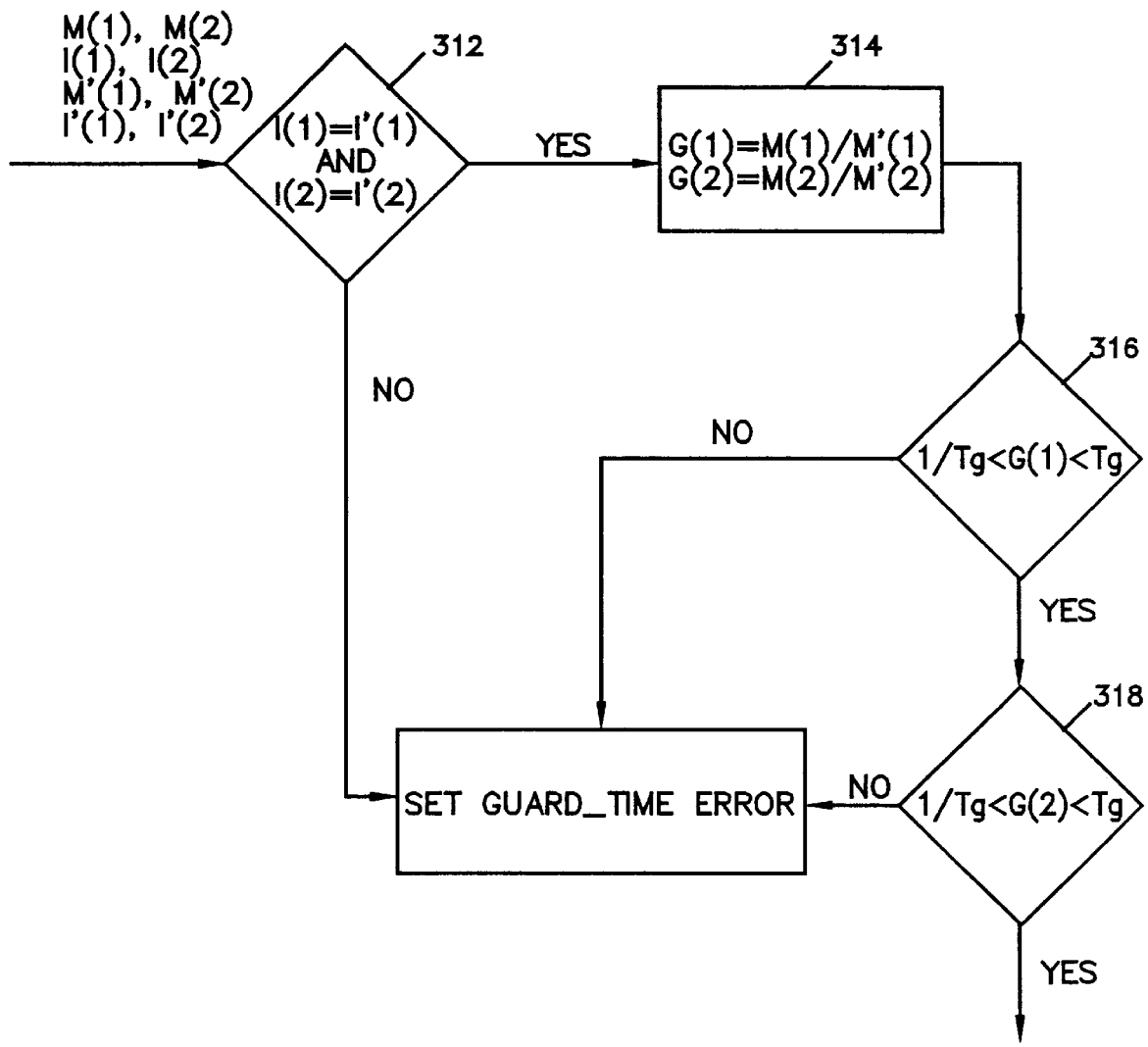
FIG. 11 illustrates operation of guard time checking functions performed by in the flowchart of FIG. 2.

Referring now to FIG. 11, a flowchart diagram illustrating the guard time check operation performed in step 136 of FIG. 2 is shown. As shown, in step 312 the DSP 106 determines if the index values I[1] and I'[1] are equal and index values I[2] and I'[2] are equal. Thus, this step determines if the DTMF signal has lasted a certain period of time. More specifically, this step determines if the indices of maximum values in consecutive frames are identical. If so, then in step 314 the DSP 106 computes the ratio or gain of the maximum value from the current and prior frame for each of the row and column frequencies. In other words, in step 314 the DSP 106 computes:

$$G(1)=M(1)/M'(1);$$

$$G(2)=M(2)/M'(2);$$

In steps 316 and 318 the DSP 106 determines if the computed ratios G1 and G2 are within a range >1/TG and <TG.

If the DSP 106 detects a DTMF signal which meets all of the criteria described above in steps 130–134, then the DSP 106 compares the maximum values with the values at the previous frame only if the indices remain the same. If the ratio, i.e., the result of the division, of the maximum values from the current and prior frame is greater than the value Tg, then the signal passes the guard-time check. It is noted that the value Tg is a programmable value that can be changed to meet different guard-time requirements. The value Tg is preferably 2.5. Thus in step 136 of FIG. 2 the DTMF detector 102 determines if the detected signal is of sufficient length to actually be a DTMF signal.

If the guard time check fails, the DSP 106 waits for the computation of the next frame or next set of data samples and compares the maximum value of current frame with the maximum value in the next frame, also assuming that the row and column indices remain the same. If the result is greater than Tg, the signal still passes the guard-time check. If this comparison fails again, then the signal on the current frame fails the guard-time check and cannot be recognized as a valid DTMF signal.

Step 138—Twist Computation and Thresholding

If the signal passes all of the above steps, then the final stage of evaluation is the twist check. Like the other parameters described above, twist is another important criteria to eliminate unqualified signals. The twist of a DTMF signal is defined as the level difference in dB between the higher and the lower tone.

$$\text{Twist} = 20\log_{10}\frac{M(2)}{M(1)}$$

Thus, if the twist is positive, the higher frequency level tone (the column frequency) is greater than the lower frequency level tone (the row frequency). In this instance, the twist is called forward twist. If the twist is negative, i.e., if the higher frequency level tone (the column frequency) is less than the lower frequency level tone (the row frequency), then the twist is called backward twist. A telecom standard typically defines a twist allowance between a forward twist threshold and a backward twist threshold. For example, AT&T requires:

$$-8 \text{ dB} < \text{twist} < +4 \text{ dB}$$

Figure 12:
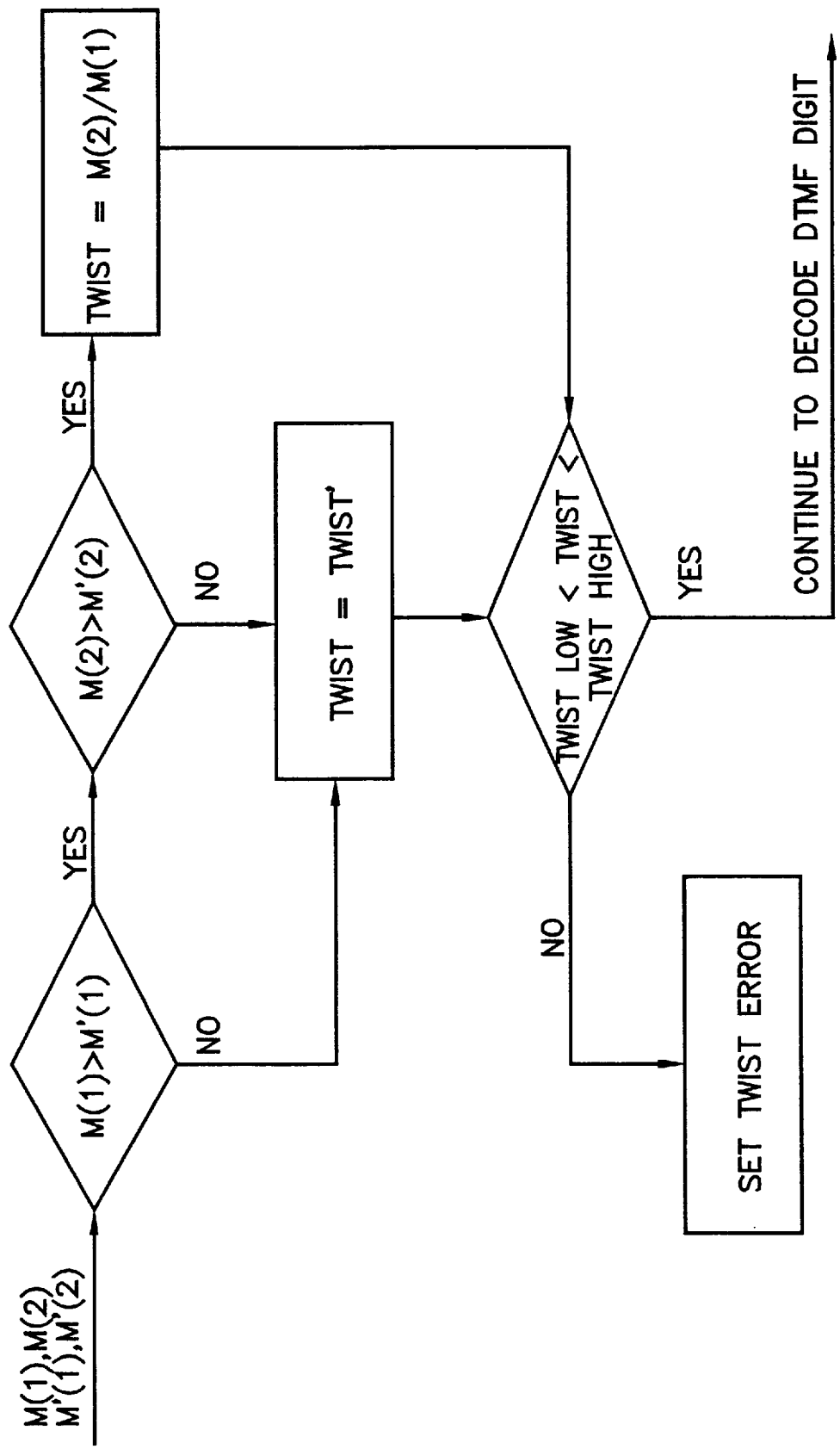
FIG. 12 illustrates operation of twist checking functions in the flowchart of FIG. 2.

When a DTMF signal travels through a telephone channel, distortion and noise are added to the DTMF signal and cause phase delay, group delay and even severe amplitude distortion. These factors complicate the twist computation. According to the preferred embodiment, the DTMF detector 102 performs a twist computation only when the signal becomes stable. The DSP 106 monitors the outputs M[1] and M[2], which are the gain adjusted outputs from step 128, and only updates the twist value when both the higher and lower tone level in the current frame is greater then the previous frame, assuming that the row and column indexes, I[1] and I[2], remain the same. This method is illustrated in FIG. 12 and is executed as the following pseudo-code:

```
IF I[1] == I'[1] AND I[2] == I'[2] THEN
    IF M[1] > M'[1] AND M[2] > M'[2] THEN
        Twist = 20 log 10 (M[2]/M[1])
    ELSE
        Twist = Twist'
    ENDIF
ENDIF
```

In practical implementation, only a linear twist value is computed to avoid logarithmic computation, and the linear twist value is then compared with linear twist thresholds to determine if the detection meets the twist requirement. Note: Twist' is the twist value for the previous frame.

I'[1] is I[1] in the previous frame, I'[2] is I[2] in the previous frame.

M'[1] is M[1] in the previous frame, and M'[2] is M[2] in the previous frame.

CONCLUSION

Therefore, the present invention comprises a system and method for performing DTMF detection with improved efficiency and accuracy. Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for detecting tones in a multitone, multifrequency detector comprising:

receiving a plurality of digital samples of a received signal, wherein said received signal includes one or more tones, wherein said one or more tones comprise one or more tones from a plurality of different frequencies, wherein said plurality of different frequencies comprise one or more frequency groups;

calculating a first portion of a frequency spectrum for each of said plurality of different frequencies, wherein said calculating produces an interim energy value for each of said different frequencies;

selecting one or more frequencies from each of said one or more frequency groups which have maximum interim energy values of said interim energy values;

calculating a remaining portion of said frequency spectrum for each of said selected one or more frequencies, wherein said calculating produces a final energy value for each of said selected one or more frequencies;

determining a maximum energy value from said final energy values for each of said selected one or more frequencies, wherein said determining determines a maximum energy value for each of said one or more frequency groups, wherein said determining is performed to detect said plurality of tones in said received signal.

2. The method of claim 1, wherein said calculating said first portion of said frequency spectrum for each of said plurality of different frequencies comprises calculating a frequency spectrum for a subset of said plurality of digital samples of said received signal for each of said plurality of different frequencies.

3. The method of claim 2, wherein said calculating said frequency spectrum for said subset of said plurality of digital samples of said received signal for each of said plurality of different frequencies comprises calculating said frequency spectrum for a different number of said plurality of digital samples of said received signal for each of said plurality of different frequencies.

4. The method of claim 2, wherein said calculating a first portion of a frequency spectrum for each of said plurality of different frequencies comprises calculating a Goertzel algorithm for a subset of said plurality of digital samples of said received signal for each of said plurality of different frequencies.

5. The method of claim 1, further comprising:
    determining if said interim energy values for all of said different frequencies have substantially low energy build-up after said calculating said first portion of said frequency spectrum;
    wherein said selecting one or more frequencies, said calculating said remaining portion of said frequency spectrum for each of said selected one or more frequencies, and said determining a maximum energy value are not performed if said interim energy values for all of said different frequencies have substantially low energy build-up.

6. The method of claim 5, wherein said plurality of digital samples of said received signal comprise a first frame of said received signal, wherein said calculating said first portion of said frequency spectrum for each of said plurality of different frequencies comprises calculating a frequency spectrum for a first subset of said plurality of digital samples of said first frame for each of said plurality of different frequencies, the method further comprising:
    repeating said calculating a first portion of a frequency spectrum and selecting one or more frequencies beginning with a second subset of said plurality of digital samples of said first frame if said interim energy values computed for said first subset of said first frame for all of said different frequencies have substantially low energy build-up.

7. The method of claim 1, wherein said calculating said first portion of said frequency spectrum for each of said plurality of different frequencies includes calculating said first portion of said frequency spectrum for second harmonic frequencies of each of said plurality of different frequencies, wherein said calculating said first portion of said frequency spectrum for said second harmonic frequencies produces an interim energy value for each of said second harmonic frequencies; the method further comprising:
    determining if one or more of said interim energy values of said second harmonic frequencies have a substantial energy build-up after said calculating said first portion of said frequency spectrum;
    wherein said selecting one or more frequencies, calculating said remaining portion of said frequency spectrum for each of said selected one or more frequencies, and said determining a maximum energy value is not performed if said interim energy values of said second harmonic frequencies have a substantial energy build-up.

8. The method of claim 7, wherein said selecting one or more frequencies for each of said one or more frequency groups comprises selecting one or more second harmonic frequencies for each of said one or more frequency groups;
    wherein said calculating a remaining portion of said frequency spectrum for each of said selected one or more frequencies comprises calculating a remaining portion of said frequency spectrum for each of said one or more second harmonic frequencies.

9. The method of claim 1, wherein said selecting one or more frequencies for each of said one or more frequency groups comprises selecting two frequencies for each of said one or more frequency groups;
    wherein said calculating a remaining portion of said frequency spectrum for each of said selected one or more frequencies comprises calculating a remaining portion of said frequency spectrum for each of said two selected frequencies.

10. The method of claim 1, wherein said one or more frequency groups comprises two frequency groups.

11. A multi tone multifrequency detector for detecting multi tone multifrequency (DTMF) signals, comprising:
    means for receiving a plurality of digital samples of a received signal, wherein said received signal includes one or more tones, wherein said one or more tones comprise one or more tones from a plurality of different frequencies, wherein said plurality of different frequencies comprise one or more frequency groups;
    a digital signal processor for calculating a first portion of a frequency spectrum for each of said plurality of different frequencies to produce an interim energy value for each of said different frequencies, wherein said digital signal processor selects one or more frequencies from each of said one or more frequency groups which have maximum interim energy values of said interim energy values and calculates a remaining portion of said frequency spectrum only for each of said selected one or more frequencies, wherein said calculation on the remaining portions produces a final energy value for each of said selected one or more frequencies, wherein said digital signal processor determines a maximum energy value from said final energy values for each of said one or more frequency groups.

12. The multi tone multifrequency detector of claim 11, wherein said digital signal processor calculates a frequency spectrum for a subset of said plurality of digital samples of said received signal for each of said plurality of different frequencies.

13. The multi tone multifrequency detector of claim 12, wherein said digital signal processor calculates said frequency spectrum for a different number of said plurality of digital samples of said received signal for each of said plurality of different frequencies.

14. The multi tone multifrequency detector of claim 12, wherein said digital signal processor calculates a Goertzel algorithm for a subset of said plurality of digital samples of said received signal for each of said plurality of different frequencies.

15. The multi tone multifrequency detector of claim 11, wherein said digital signal processor determines if said interim energy values for all of said different frequencies have substantially low energy build-up;

wherein said digital signal processor does not calculate said remaining portion of said frequency spectrum for each of said selected one or more frequencies if said interim energy values for all of said different frequencies have substantially low energy build-up.

16. The multi tone multifrequency detector of claim 11, wherein said digital signal processor calculates a first portion of a frequency spectrum for second harmonic frequencies of each of said plurality of different frequencies to produce an interim energy value for each of said second harmonic frequencies;

wherein said digital signal processor determines if one or more of said interim energy values of said second harmonic frequencies have a substantial energy build-up;

wherein said digital signal processor does not calculate said remaining portion of said frequency spectrum for each of said selected one or more frequencies if said interim energy values of said second harmonic frequencies have a substantial energy build-up.

17. The multi tone multifrequency detector of claim 1, wherein said detector is a dual tone multi frequency detector.

* * * * *

UNITED STATES PATENT AND TRADEMARK OFFICE
CERTIFICATE OF CORRECTION

PATENT NO. : 5,809,133
DATED : September 15, 1998
INVENTOR(S) : John G. Bartkowiak and Zheng-yi Xie It is certified that error appears in the above-identified patent and that said Letters Patent is hereby corrected as shown below:

Claim 17, col. 24, line 9, please delete "claim 1" and substitute "claim 11".

Signed and Sealed this

Fifth Day of January, 1999

Attest:

Attesting Officer

Acting Commissioner of Patents and Trademarks